United States Patent [19]

Levinson

[11] Patent Number: 4,852,180
[45] Date of Patent: Jul. 25, 1989

[54] SPEECH RECOGNITION BY ACOUSTIC/PHONETIC SYSTEM AND TECHNIQUE

[75] Inventor: Stephen E. Levinson, Westfield, N.J.

[73] Assignee: American Telephone and Telegraph Company, AT&T Bell Laboratories, Murray Hill, N.J.

[21] Appl. No.: 34,467

[22] Filed: Apr. 3, 1987

[51] Int. Cl.[4] .................................................. G10L 7/08
[52] U.S. Cl. ...................................................... 381/43
[58] Field of Search ..................... 381/41–43, 381/44–45; 364/513, 513.5

[56] References Cited

U.S. PATENT DOCUMENTS

| 4,277,644 | 7/1981 | Levinson et al. | 381/43 |
| 4,587,670 | 5/1986 | Levinson et al. | 381/43 |
| 4,718,094 | 1/1988 | Bahl et al. | 364/513.5 |
| 4,761,815 | 8/1988 | Hitchcock | 381/43 |
| 4,783,804 | 11/1988 | Juang et al. | 381/43 |

OTHER PUBLICATIONS

Bourlard et al., "Speaker Dependent Connected Speech Recognition Via Phonemic Markov Models", IEEE ICASSP 85, pp. 1213–1216.
Speech and Speaker Recognition, "A Task–Oriented Conversational Mode Speech Understanding System", S. E. Levinson et al, pp. 149–196 (1985).
IEEE Transactions on Acoustics, Speech and Signal Processing, vol. ASSP-23, No. 1, Feb. 1975, "Motivation and Overview of SPEECHLIS: An Experimental Prototype for Speech Understanding Research", pp. 2–10, W. A. Woods.
IEEE Transactions on Acoustics, Speech and Signal Processing, vol. ASSP-23, No. 1, Feb. 1975, "Minimum Prediction Residual Principle Applied to Speech Recognition", pp. 67–72, F. Itakura.
Computer Speech and Language, vol 1, 1986, "Continuously Variable Duration Hidden Markov Models for Automatic Speech Recognition", S. E. Levinson, pp. 29–45.
The Art of Computer Programming, D. E. Knuth, vol. 1 (pp. 230–231) and vol. 3 (pp. 506–542).

Primary Examiner—Gary V. Harkcom
Assistant Examiner—John A. Merecki
Attorney, Agent, or Firm—Wilford L. Wisner

[57] ABSTRACT

A speech recognition system and technique of the acoustic/phonetic type is made speaker-independent and capable of continuous speech recognition during fluent discourse by a combination of techniques which include, inter alia, using a so-called continuously-variable-duration hidden Markov vodel in identifying word segments, i.e., phonetic units, and developing proposed phonetic sequences by a durationally-responsive recursion before any lexical access is attempted. Lexical access is facilitated by the phonetic transcriptions provided by the durationally-responsive recursion; and the resulting array of word candidates facilitates the subsequent alignment of the word candidates with the acoustic feature signals. A separate step is used for aligning the members of the candidate word arrays with the acoustic feature signals representative of the corresponding portion of the utterance. Any residual work selection ambiguities are then more readily resolved, regardless of the ultimate sentence selection technique employed.

14 Claims, 8 Drawing Sheets

KEY MATCHES DICTIONARY ENTRY

OTHER ALIGNMENT ALGORITHMS ARE POSSIBLE SUCH AS THOSE BASED ON DYNAMIC PROGRAMMING

ALL PAIRS OF ADJACENT STATES IN $\hat{\underline{q}}$ ARE USED AS KEYS

PHONOTACTIC MODEL FOR DIGITS

SPEECH RECOGNITION BY ACOUSTIC/PHONETIC SYSTEM AND TECHNIQUE

TECHNICAL FIELD

This invention relates to speech recognition systems and more particularly to the types of such systems which are speaker independent.

BACKGROUND OF THE INVENTION

It has been generally recognized that speech recognition is the most difficult of the three generic kinds of problems in the speech processing area. Speech coding of course is by now the most commercial type of speech processing equipment; and there is also some commercial equipment for speech synthesis.

Nevertheless, the speech recognition problem has been intractable to a large degree. Most recognition systems have been restricted in their ability to recognize speech from different speakers or to recognize more than an extremely limited vocabulary in an extremely focused or task-directed environment.

It has also been widely recognized that it would be desirable to have a speech recognition system that was capable of continuous speech recognition.

In recent years several word-based continuous speech recognition systems have been built. For example, one such system that has been built is that described by S. E. Levinson and L. R. Rabiner "A Task-Oriented Conversational Mode Speech Understanding System", *Speech and Speaker Recognition*, M. R. Schroeder, Ed., Kargar, Based Switzerland, pp. 149–96, 1985. That system and other similar systems recently developed are word-based in the first instance. While these systems have all been successful in their ability to accurately recognize speech in certain restricted ways, there is reason to believe that their use of words as the fundamental acoustic patterns precludes the possibility of relaxing the constraints under which they presently operate so that they can accept fluent discourse of many speakers over large vocabularies.

An often suggested alternative to the word-based approach is the so called acoustic/phonetic method in which a relatively few short-duration phonetic units, out of which all words can be constructed, are defined by their measurable acoustic properties. Generally speaking, speech recognition based on this method should occur in three stages. First, the speech signal should be segmented into its constituent phonetic units which are then classified on the basis of their measured acoustic features. Second, the phonetic units should then be combined to form words on some basis, using in part a lexicon which describes all vocabulary words in terms of the selected phonetic units. Third, the words should be combined to form sentences in accordance with some specification of grammar.

Several quite different embodiments of this basic methodology can be found in the literature if one is diligent to search for the less obvious aspects of some of the above components. See for example, the article by W. A. Woods, "Motivation and Overview of SPEECH-LIS: An Experimental Prototype for Speech Understanding Research", *IEEE Transactions on Acoustics, Speech and Signal Processing*, Vol. ASSP-23, No. 1, February 1975, pp. 2–10. All such systems are very complex systems in which the basic components as outlined above are always present yet sometimes in disguised form. The fact that all these elements aren't fully capable with respect to all syntax and with respect to all vocabulary means that they are very restricted in their use (e.g., task-oriented, as, for instance, retrieval of lunar rock sample information).

Accordingly, it is an object of this invention to provide an organization of such systems which is powerful in its ability to encompass all grammar and vocabulary and all speakers and is methodically organized so that it can be readily expanded.

It is a further object of this invention to provide an organization of such a system that handles durational variations in speech with facility and without the complexity of the so-called dynamic time-warping techniques.

BRIEF SUMMARY OF THE INVENTION

According to the present invention, an acoustic/phonetic speech recognition method of the type described above is adapted so that each step is duly responsive to the phonetic durational information that can be derived from the waveform of the utterance, as well as to likelihood signals for members of the arrays of candidate phonetic symbols and to the likelihood signals for members of the arrays of candidate words.

Further, according to a very significant feature of the present invention, the ability to make an appropriate choice among candidate words is improved by aligning, or comparing, the members of the candidate word arrays with the acoustic feature signals representative of the corresponding portions of the utterance.

The output of this word selection process consists of only the very best candidates for each word which are then input into the final sentence selection step as described at the outset. In general, it is necessary to input several candidates for each word to the sentence selection step because the final ambiguities in words, especially in the English language, can only be resolved by the grammatical rules that have to do with the formation of sentences. Nevertheless, any of the prior proposed techniques for applying rules of grammar to form phrases and sentences can be used in this final part of the apparatus.

My invention provides a powerful organization for further development, elaboration and expansion because, unlike the speech recognition systems described above, this one clearly and directly follows the outline of the acoustic/phonetic method as given above and is more capable of being implemented in the context of the most complicated applications. The directness and simplicity of the implementation derives from the use of the continuously-variable-duration hidden Markov model as a model of the acoustic/phonetic structure of the language, instead of the less comprehensive set of phonological rules used in the prior art. The term "Markov" here refers to the probabilistic and not directly observable events which underlie the speech signal.

The continuously-variable-duration hidden Markov model employed in this invention represents the acoustic/phonetic structure of speech, rather than representing words directly. The phonetic units are identified with the unobservable states of the underlying Markov chain. The other parameters of the system are organized so that a dynamic programming algorithm can be used to obtain a phonetic transcription of an utterance.

In a preferred embodiment of my invention the lexical access phase of recognition is based on a pronouncing dictionary (above, termed a lexicon) in which each entry is orthographically represented in terms of phonetic symbols representing the states of the hidden Markov chain. Certain other features of the preferred embodiment will become apparent hereinafter.

The recognition process is then readily completed by prior art types of sentence recognition schemes by recovering from the word lattice the grammatically well-formed sentence of maximum likelihood conditioned on the measurements. It is expected that this final part of the recognition process will work more efficiently because of the candidate arrays and likelihood signals provided by the present invention.

GENERAL DESCRIPTION

Figure 1:
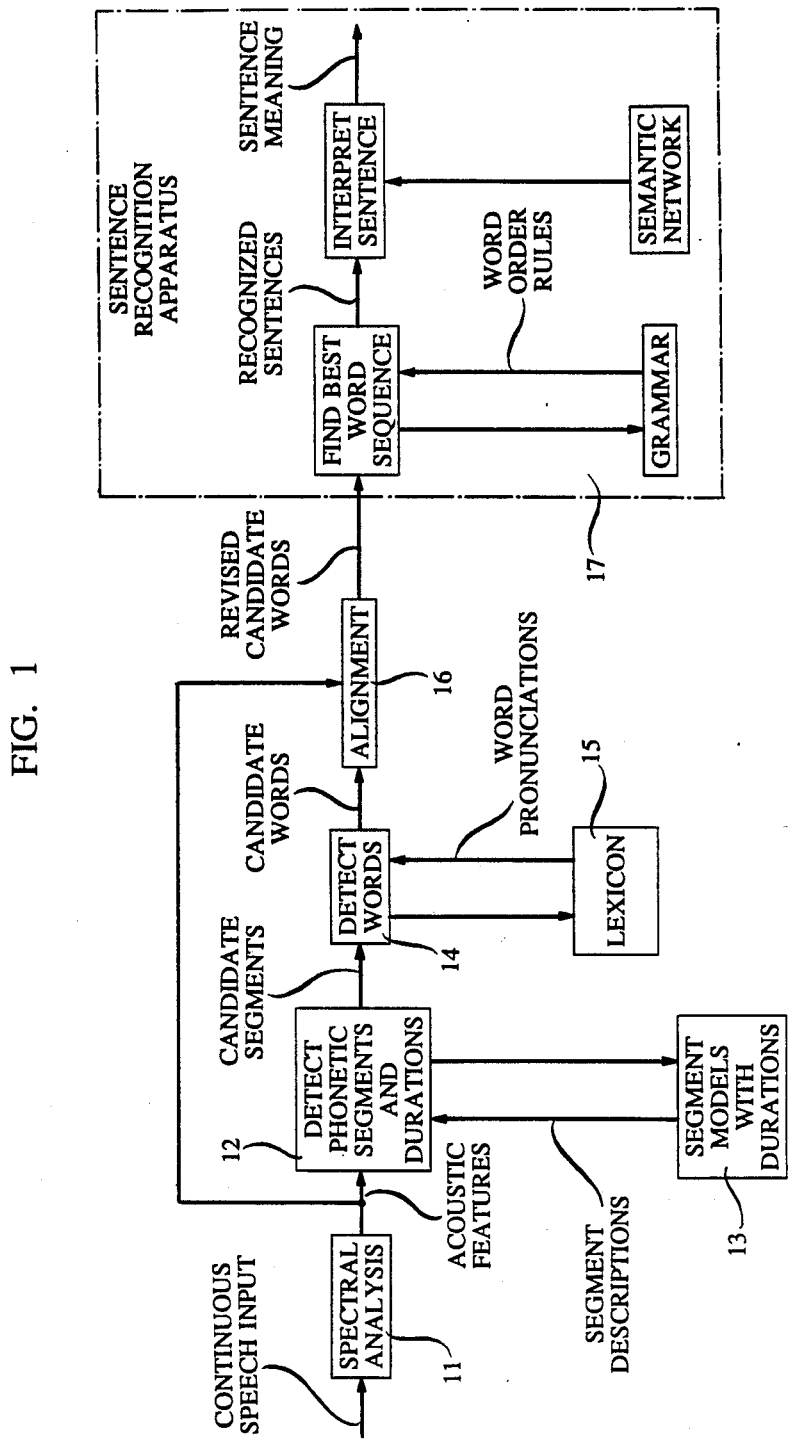
FIG. 1 shows schematically the novel organization of the new acoustic/phonetic speech recognition system.
Figure 2:
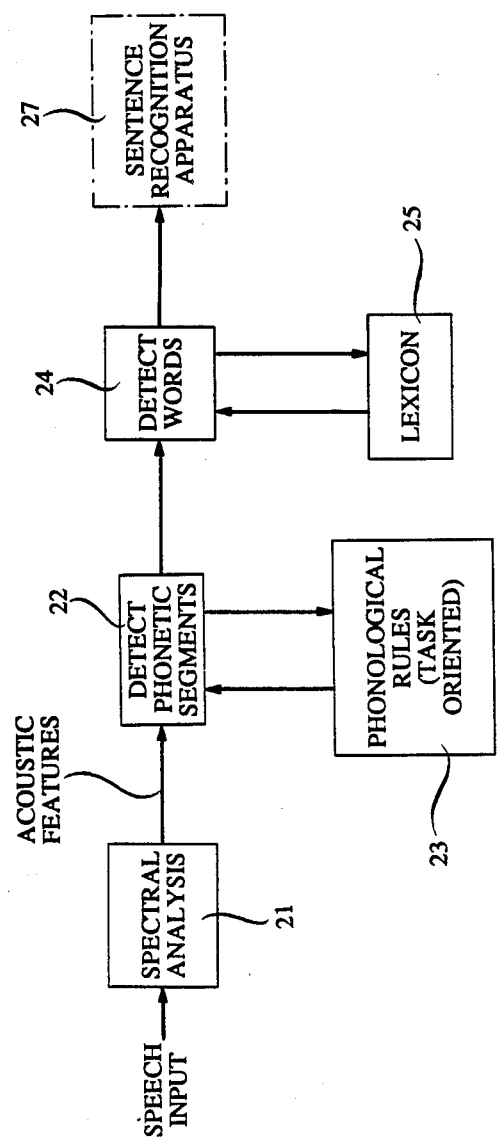
FIG. 2 shows schematically the prior art, of which the above-described Woods' article is representative.

In the embodiment of FIG. 1 the input speech stream is illustratively derived from a human speaker; but the use of a speech stream from another machine is not precluded. The speech stream flows into equipment of known type shown as block 11 for linear predictive coding analysis (usually referred to as LPC analysis). The fundamental organization and composition of the equipment for the apparatus of block 11 is disclosed in some detail by F. Itakura in the article, "Minimum Prediction Residual principle Applied to Speech Recognition", *IEEE Transactions on Acoustic Speech and Signal Processing*, Vol. ASSP-23, No. 1, February 1975. Nevertheless, with modern large scale integrated electronics several other implementations are possible as, for example, implied by FIG. 2 of my above-cited article with L. R. Rabiner.

The resulting sets of speech feature signals are then processed by a combination of techniques in the system portion 12 not only to detect phonetic segments with some degree of likelihood, but also to provide some valuable durational information with the arrays of segments. The algorithm for processing in apparatus 12 accesses a stored model 13 which is a so-called continuously-variable-duration hidden Markov model, as described in my article "Continuously Variable Duration Hidden Markov Models for Automatic Speech Recognition", *Computer Speech and Language*, Vol. 1, pp. 29-44, Academic Press Inc., (London) Limited (1986). In addition, there is provided in portion 12 a searching and sorting technique which will be more fully described hereinafter and advantageously exploits complementary phonetic information. Next, with the candidate phonetic segments and durations, the system portion 14 accesses the lexicon 15 (an extensive memory electronically stored in a computer), preferably by pairs of phonetic segments, to obtain arrays of candidate words.

Then, an alignment procedure is carried out in system portion 16 in response to the acoustic features from the LPC analysis in block 11 to compute the likelihood signals for the indicated candidate words.

The preferred implementation of apparatus 12-16 is advantageously upon a digital computer, for example, of the type Alliant FX-8, manufactured by the Alliant Computer Corporation, Acton, Ohio. Significant sets of computer codes relevant to the present invention are contained in Appendix B. The model 13, the lexicon 15, and the sentence recognition apparatus 17 all use very substantial amounts of previously-determined information stored in memories therein.

The output of the alignment apparatus 16 is then fed into a prior art sentence recognition apparatus 17 of any of several types which resolves the remaining ambiguities among word candidates and selects the best sentence.

A basic understanding of the invention may be gained by considering the following points. One fundamental underpinning of the acoustic/phonetic embodiment proposed here is the assumption that speech is a code based on a small number of symbols. While the identity of these symbols is unknown, the physical manifestations of them can be observed directly by making measurements on the acoustic signal. Under this assumption and in light of experiments by many previous investigators, it is quite natural to model such a phenomenon as a so-called hidden Markov chain. Since the symbols of the code are assumed discrete, unknown and not directly observable, it is reasonable to identify them with the states of an underlying, unobservable probabilistic chain of events which chain of events is called commonly a Markov chain. On the other hand, the acoustic signal is accessible and its spectral and temporal features are presumed to be correlated with the symbols of the code. It is thus appropriate to represent the signal by a set of statistical distributions of acoustic observations and to associate one distribution with each state of the Markov chain. In order to account for temporal encoding of information in the signal we should also include a mechanism for characterizing the durations of the states probabilistically.

DETAILED DESCRIPTION

It appears, then, that the continuously-variable-duration hidden Markov model rather neatly captures certain essential aspects of the speech signal. The phonetic units (i.e., code symbols) are represented by the hidden states $\{q_i\}_{i=1}^n$. The state transition probabilities, $a_{ij}$, of the hidden Markov chain account for the phonotactic structure of speech (i.e. the code itself). The acoustic correlates of the symbols are the time-indexed observations $O_t \in R^d$. The spectral information is contained in the set of observation densities, $\{b_j(O_t)\}_{j=1}^n$, and the temporal information resides in the set of durational densities $\{d_j(t)\}_{j=1}^n$.

The d-dimensional observation densities should be Gaussian and the durational densities, gamma distributed. Under these assumptions the parameters of an n-state model are the state transition probabilities, $a_{ij}$, $1 \leq i,j \leq n$; the observation means, $\mu_{jk}$, $1 \leq j \leq n$, $1 \leq k \leq d$, the observation covariances, $\mu_{jkl}$, $1 \leq j \leq n$, $1 \leq k,l, \leq d$; and the durational shape and location parameters, $\nu_j$ and $\eta_j$ $1 \leq j \leq n$. For this parametrization, methods are known for computing an optimal set of values. One such method will be referred to hereinafter.

In some speech recognition systems based on hidden Markov models, each vocabulary word is represented by a different model whose likelihood function can be evaluated for a given input and used in a Bayesian classification scheme. In my system, however, the state sequence plays the dominant role since it yields a phonetic transcription. The likelihood function is also used but for a less critical purpose, as we shall later see.

In the present acoustic/phonetic system the main issue, then, is how to determine the state sequence corresponding to a given speech signal. This is accomplished preferably by a dynamic programming algorithm that accounts for durational densities.

Let $\alpha_t(j)$ be the likelihood of the state sequence ending in state j which maximizes the joint likelihood of state and observation sequences up to and including time t. This quantity can be calculated recursively from $$\alpha_t(j) = \max_{1 \leq i \leq n} \left( \max_{\tau \leq t} \left( \alpha_{t-\tau}(i) \, a_{ij} d_j(\tau) \prod_{\theta=1}^{\tau} b_j(O_{t-\tau+\theta}) \right) \right) \quad (1)$$

for $1 \leq j \leq n$ and $1 \leq t \leq T$ (The terms in equation 1 being defined in Appendix A).

If we simultaneously set (2)

$$\beta_t(j) = (i, \tau) = \operatorname*{argmax}_{i, \tau} \{\alpha_t(j)\},$$

then we can trace back from the final state (3)

$$jT = \operatorname*{argmax}_{j} \{\alpha_T(j)\}$$

to reconstruct the desired state sequence, thereby obtaining the phonetic transcription of the input.

The task of interpreting the phonetic transcription obtained from equations 1–3 as a sequence of words is not unlike that of reading a text corrupted by random insertions, deletions and substitutions of letters and stripped of spaces between words. The method by which we propose to render the interpretation is based on the psycholinguistic notion of lexical access.

The basic premise of the concept of lexical access is that words are stored in a dictionary where they are represented in some phonetic orthography rather than in terms of acoustic features. In the cognitive process of understanding speech, words are retrieved from the dictionary on the basis of partial phonetic information. The phonetic to lexical mapping is thus inherently many-to-one resulting in two kinds of ambiguities. First, phonetic sequences may be common to several words. Second, words may be retrieved on the basis of several different phonetic sequences. The first form of ambiguity makes the recognition problem more difficult and must be resolved at a latter stage of processing. The second kind, however, is beneficial. Since the phonetic transcription is corrupted, we need a multiplicity of cues for a given word. The particular lexical access procedure used in our invention advantageously provides a method for exploiting complementary phonetic information.

The particular form of the technique used here is as follows. Suppose that the phonetic transcription resulting from the evaluation of equations 1–3 is the state sequence $$q = q_1, q_2 \ldots q_t, q_{t+1}, \ldots, q_{t+p}, \ldots, q_N. \quad (4)$$

where $q_i$ is the number of the $i^{th}$ state of the sequence for $1 \leq i \leq N$. We consider all $p+1$ tuples of the form $$q = q_t, q_{t+1}, \ldots, q_{t+p} \quad (5)$$

for $1 \leq t \leq N-p$ and fixed p. Each such q is taken as the argument of a hashing function, $$f(q) = \left[ \sum_{i=0}^{p} q_{t+i} \right] \bmod P = a \quad (6)$$

whose value, a, is an address in the lexicon. The prime number, P, is chosen to be greater than the number of entries in the lexicon which is arranged so that the $a^{th}$ entry has an orthographic representation containing q as a subsequence. The lexicon is also constructed so that the $a^{th}$ entry has a link to another word containing q. The last word in the chain has a null link. In general, each lexical item contains more than one $p+1$ tuple and thus must have a separate link for each one. The links can all be generated automatically from the lexical orthographic representations and need not be constructed manually.

Further details of the mathematics and computer implementation of such a technique in general can be found in the book by D. E. Knuth, *The Art of Computer Programming*, Addison-Wesley, Vol. 1, pp. 230–231, and Vol. 3, pp. 506–542, particularly those portions relating to "searching and sorting".

The lexical access procedure described above has the effect of giving coarse estimates of the locations of words, e.g., their beginnings and ends, in the speech stream. As noted, these locations are likely to be inconsistent. In order to resolve the ambiguity, we need to extract more information from the acoustic measurements and the phonetic transcription and represent that information in such a way that an optimal interpretation of the signal can be obtained. In particular, we wish to calculate the likelihood, $L(\nu|\tau_0,\tau_m)$, that the word $\nu$ appears in the time interval $(\tau_0,\tau_m)$. Once computed for all words found by the access procedure, this information can usefully be represented by a graph called a word lattice.

Let us first consider a theoretically optimal approach to the problem. Suppose that the accessed word, $\nu$, has orthography $\hat{q} = \hat{q}_1, \hat{q}_2, \ldots, \hat{q}_m$ in which the subsequence matching the phonetic transcription is $q = \hat{q}_l, \hat{q}_{l+1}, \ldots, \hat{q}_{l+p}$. Suppose, further, that we know that, at the very earliest, $\nu$ began at time $\tau_0$ and ended no later than $\tau_m$. Then q must have occurred somewhere in that interval with state $q_i$ ending at some time $\tau_i \epsilon (\tau_0, \tau_m)$ and of course, $\tau_{i+1} > \tau_i$ for $1 \leq i \leq m$. A reasonable definition of $L(\nu|\tau_0, \tau_m)$, then, is the maximum value of the joint likelihood of $O_{\tau_0}, \ldots, O_{\tau_m}$ and $q_1, q_2, \ldots, q_m$ over all choices satisfying the constraints of the state transition times $\tau_0, \tau_1, \ldots, \tau_m$. That is, $$L(\nu/\tau_0, \tau_m) = \max_T \{L[O_{\tau_0} \ldots O_{\tau_m}, q|\tau_0, \tau_m]\} \quad (7)$$

-continued where $T$ is the set of all possible state transition times, namely $$T = \{\tau_0, \tau_1, \ldots, \tau_m | \tau_0 < \tau_0 < \tau_1 < \ldots < \tau_m \leq \tau_m\}. \quad (8)$$

As defined in (7) $L(\nu | \tau_0, \tau_m)$ can be computed from $$\log[L(\nu|\tau_0, \tau_m)] = \max_T \left\{ \sum_{i=1}^{m} \left[ \log a_{q_{i-1}q_i} + \sum_{t=\tau_{i-1}}^{\tau_i} \log b_{q_i}(O_\tau) + \log d_{q_i}(\tau_i - \tau_{i-1}) \right] \right\}. \quad (9)$$

Although (9) is correct, it is practically useless since the cardinality of $T$ is, in general, very large. There is, however, an efficient way to compute $L(\nu | \tau_0, \tau_m)$. Let $\gamma_t(q_i)$ be the maximum joint log-likelihood of $O_{\tau 0} \ldots O_t$ and $\hat{q}_i, \hat{q}_2, \ldots, \hat{q}_i$. Then $\gamma_t(\hat{q}_i)$ can be calculated recursively for $\tau_0 < t \leq \tau_m$ and $1 \leq i \leq m$ from $$\gamma_t(q_i) = \max_{\tau < t} \left\{ \gamma_{t-\tau}(q_{i-1}) + \log a_{q_{i-1}q_i} + \sum_{\theta=1}^{\tau} \log b_{q_i}(O_{t-\tau+\theta}) + \log d_{q_i}(\tau) \right\}. \quad (10)$$

Finally, $$\log[L(\nu|\tau_0, \tau_m)] = \gamma_{\tau_m}(q_m) \quad (11)$$

The lexical access and alignment procedure outlined above will generate many lexical hypotheses some of which will be inconsistent. We would like to retain all such hypotheses in a convenient form so that we can subsequently resolve the ambiguities and thereby recover the best sentence.

The data structure which meets the requirements is the word lattice. The horizontal direction in the lattice represents time and alternative lexical hypotheses are arranged vertically so that inconsistent hypotheses appear as sets of blocks having the same horizontal but different vertical positions. Such a data structure is conveniently stored in the computer as a directed graph whose vertices are word boundaries and whose edges are words weighted by their respective log likelihoods always directed forward in time. Let us denote the edge representing word $\nu$ during the interval from $\tau_i$ to $\tau_j$ having likelihood $L(\nu | \tau_i, \tau_j)$ by $(\tau_i, \nu, \tau_j, L_\nu)$. Of course, in general, there will be gaps and overlaps in the lattice which would render the corresponding graph disconnected. This problem is eliminated by identifying two distinct boundaries whenever their times of occurrence are within an appropriate, empirically chosen neighborhood of each other.

Figure 3:
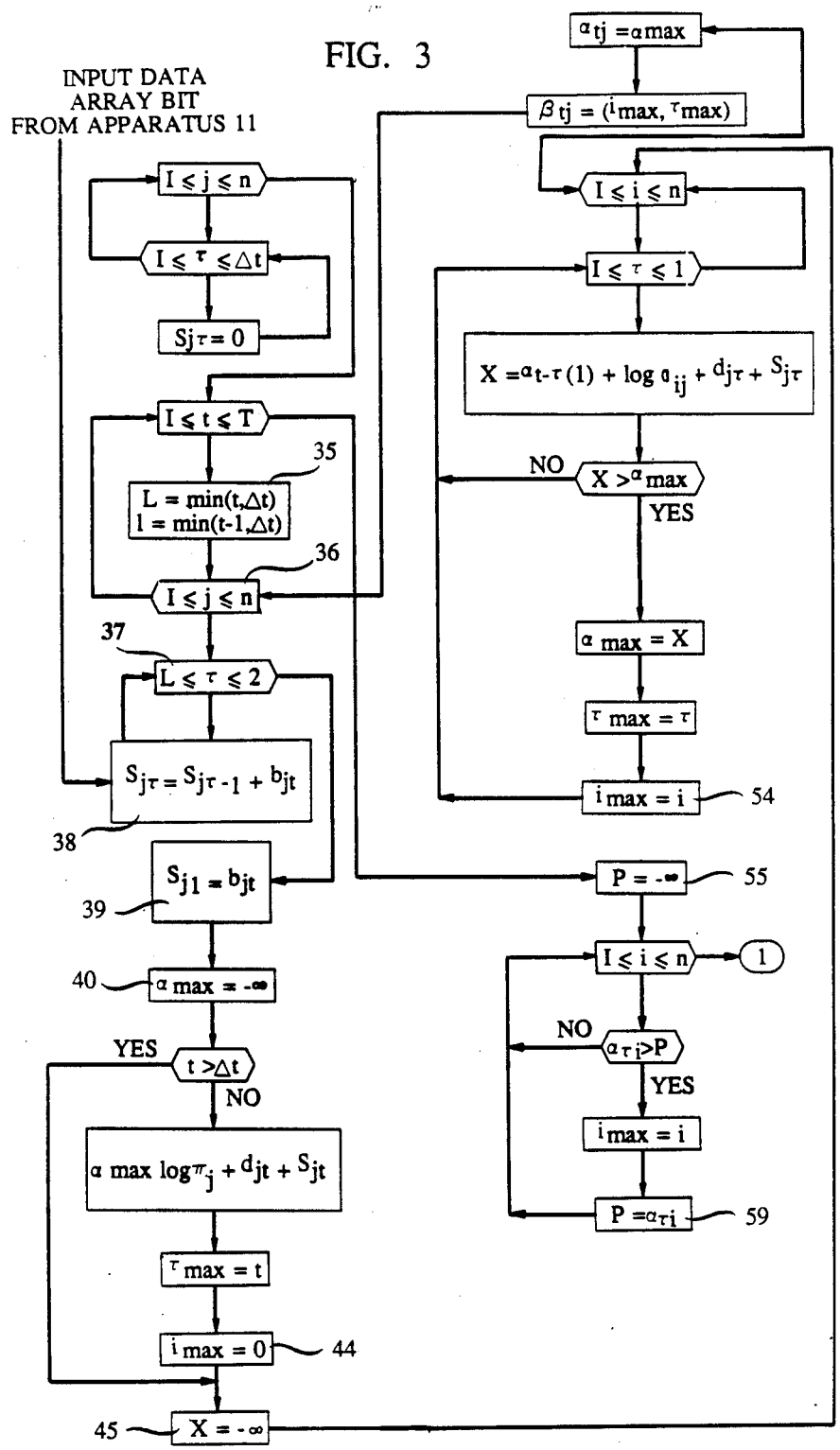
FIG. 3 is a flow diagram for an optimization algorithm for detecting phonetic segments and durations, as required in the embodiment of FIG. 1.
Figure 4:
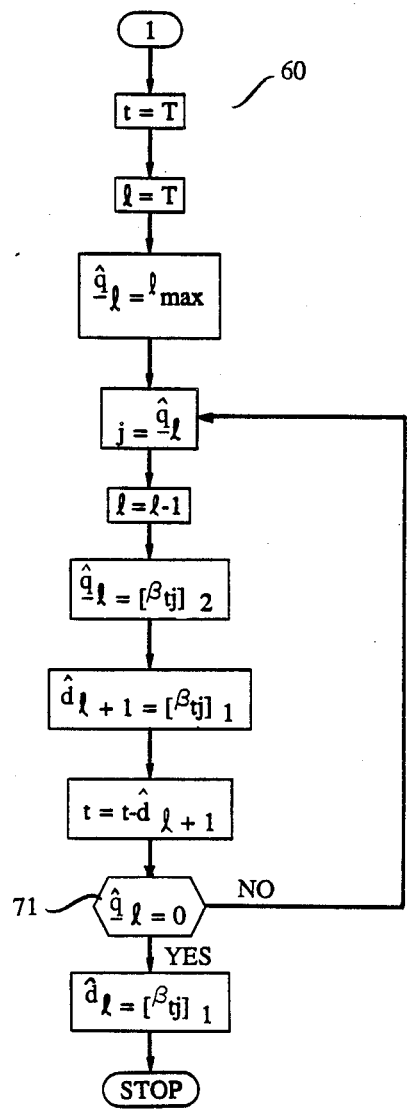
FIG. 4 is a continuation of the flowchart of FIG. 3.

Now let use turn to the flow diagram of FIGS. 3 and 4. The first step in the operation of the central processor of the computer is to reset all of the central processing registers to the appropriate starting condition. The input data from apparatus 11 will come in as an array of quantities to be stored in an input register and we have designated this array as array $b_{j\tau}$ as indicated in the flow diagram.

All processing through block 35 sets initial memory values. Blocks 36 and 37 increment state and time indices. Blocks 38–39 compute the sum of log probabilities of observations.

Blocks 40–44 compute the maximum likelihood of the first t observations originating in the initial state.

Blocks 45–54 compute the maximum probability of the first t observations originating from any state sequence.

Blocks 55–59 determine the most likely state from which the last observation was generated, and the likelihood of the observation sequence.

Block 30-end reconstructs the optimal state sequence.

All of the needed parameters for the first array of input data to procedures described above have now been calculated and the process then proceeds to work on the next array of input data. Each set of data resulting from the iterative cycling through flow diagram of FIGS. 3 and 4 can then be stored in an appropriate position in a memory for use in the final calculations of equations 1, 2 and 3 above so that finally the phonetic transcription of the input is reconstructed from the desired state sequences of each cycle.

As mentioned above, the task of interpreting the resulting phonetic transcription is like reading a text in which the words are run together and there are random insertions, deletions and substitutions.

Figure 5:
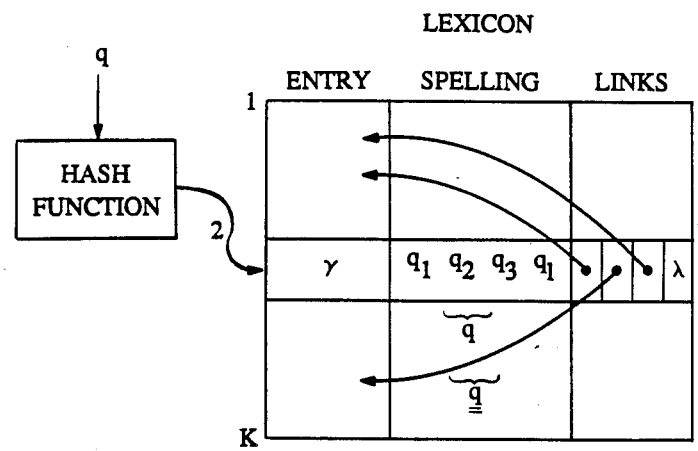
FIG. 5 is a block diagram representing some of the operations performed in the initial lexical access procedure for detecting words.
Figure 6:
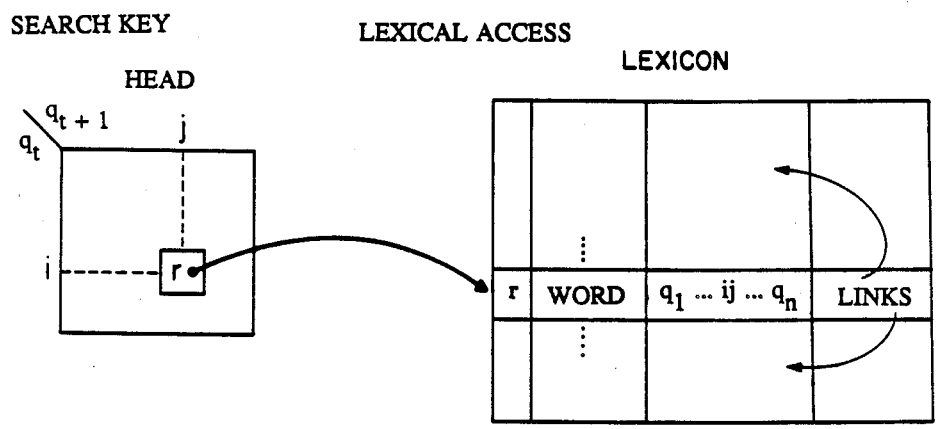
FIG. 6 is a diagram that illustrates some concepts employed in the flow chart of FIG. 7 as will be described below.

One particular form of the technique used here is illustrated in FIGS. 5 and 6.

For the special case of $p=1$, the hash function, equation (6), can be replaced with the HEAD table as shown in FIG. 6. For the significance and implementation of the HEAD table, see Knuth, Vol. 3 (cited above). If $q = q_t q_{t o+1} = i,j$ then the entry row i and column j of the HEAD table, r, is the address of the lexical entry containing q. This table is also easily constructed automatically. The HEAD table method can be generalized to $p=2$ or even more, but eventually it becomes inefficient.

It is not necessary to use the definition of equation 7 nor the recursion of equation 10 because of the existence of the following utterly simple and highly effective heuristic. Let us simply define $L(\nu | \tau_0, \tau_m)$ to be the joint likelihood of $O_{\tau 0} \ldots O_{\tau m}$ and $\hat{q}$, where the state transition times are determined by the state durations computed from equation 2. Thus we can easily compute log $[L(\nu | \tau_0 \tau_m)]$ from equation (9) without the maximization over $T$ using, instead, the previously computed segmentation of the phonetic transcription.

Figure 7:
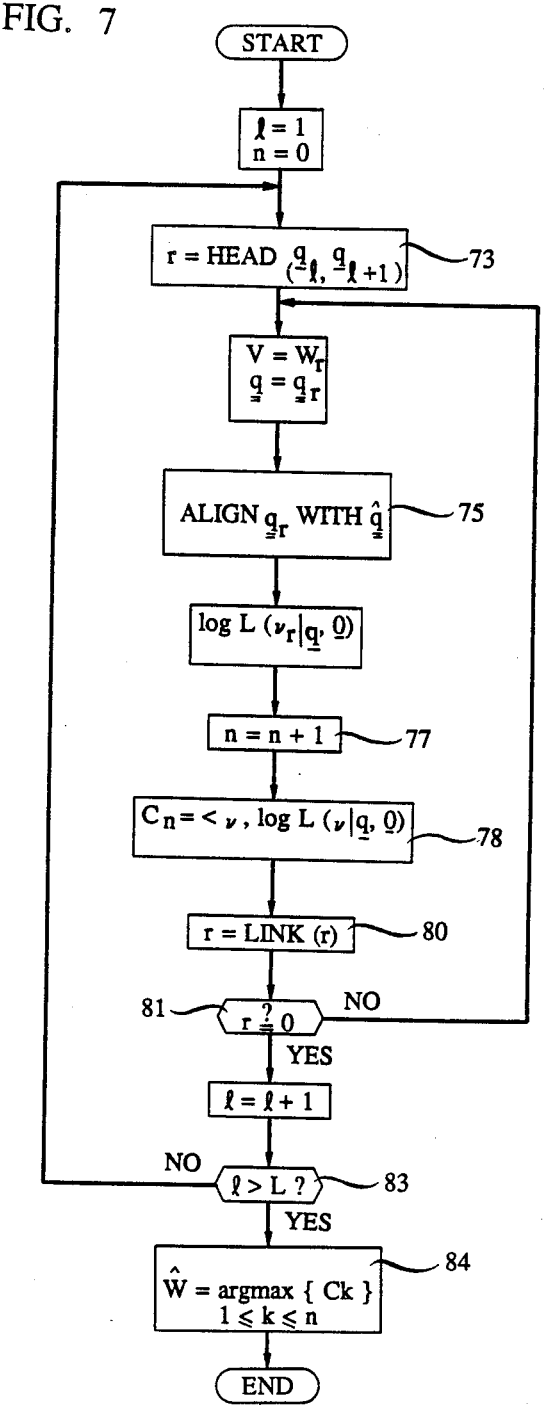
FIG. 7 is a flow chart relating to the alignment step.
Figure 8:
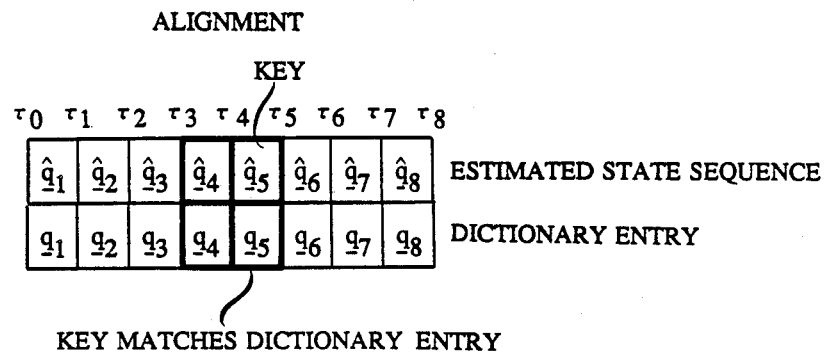
FIG. 8 shows the concept of using pairs of adjacent phonetic segments in the alignment step.

The flowchart for accomplishing the most essential calculations of equations 4–10 is shown in FIG. 7. This flowchart together with the alignment diagram of FIG. 8 illustrates how the various results of the previous steps, now stored in various large-scale memories in the computer, cooperate in the alignment step. The initial access is shown in block 73. The alignment as shown in FIG. 8 is represented by blocks 75–77. Block 8 depicts the computation of the word likelihood from the following $$\log L(\nu | q, O) = \sum_{l=1}^{L-1} \left[ \log a_{q_l q_{l+1}} + \sum_{t=\tau_{l-1}}^{\tau_l} b_{q_l t} + d_{q_l} \right] \quad (12)$$

N.B. $q_R q_{R+1} = q_l q_{l+1}$ for some $k,l$ and its storage on the candidate list. Block 80 shows how the linked list is used to access the next candidate word. Block 81 is a test for the last link in the list. When this test succeeds, control is returned to the state counter and the next state pair is presented to the HEAD table. Block 83 shows the test for the last state pair. When this test succeeds, control passes to block 84 in which the best candidate is chosen and the process terminates.

The alignment process shows how an estimated state sequence can be matched to a dictionary entry. In general the match will not be perfect but there will be multiple state sequences which will partially match the estimated state sequence of the candidate word.

It should be noted in the passing that other alignment algorithms are possible such as those based on dynamic programming even though it is our objective to avoid dynamic time-warping if possible. These other algorithms are compatible with the feature of my invention which has introduced the concept of using the separate alignment step indicated in FIG. 1.

One final comment on the alignment procedure of FIG. 7, is that, in principle, all pairs of adjacent states in $\hat{q}$ should be used as keys in the alignment process.

The details of the sentence recognition apparatus 17 are not an essential part of my invention. It is suggested that an appropriate organization of the sentence recognition apparatus could be that disclosed in my U.S. Pat. No. 4,277,644, issued July 7, 1981.

As an alternative to the above referenced technique, it will be immediately apparent to many workers in the art that various other sentence recognition techniques can be used.

Figure 9:
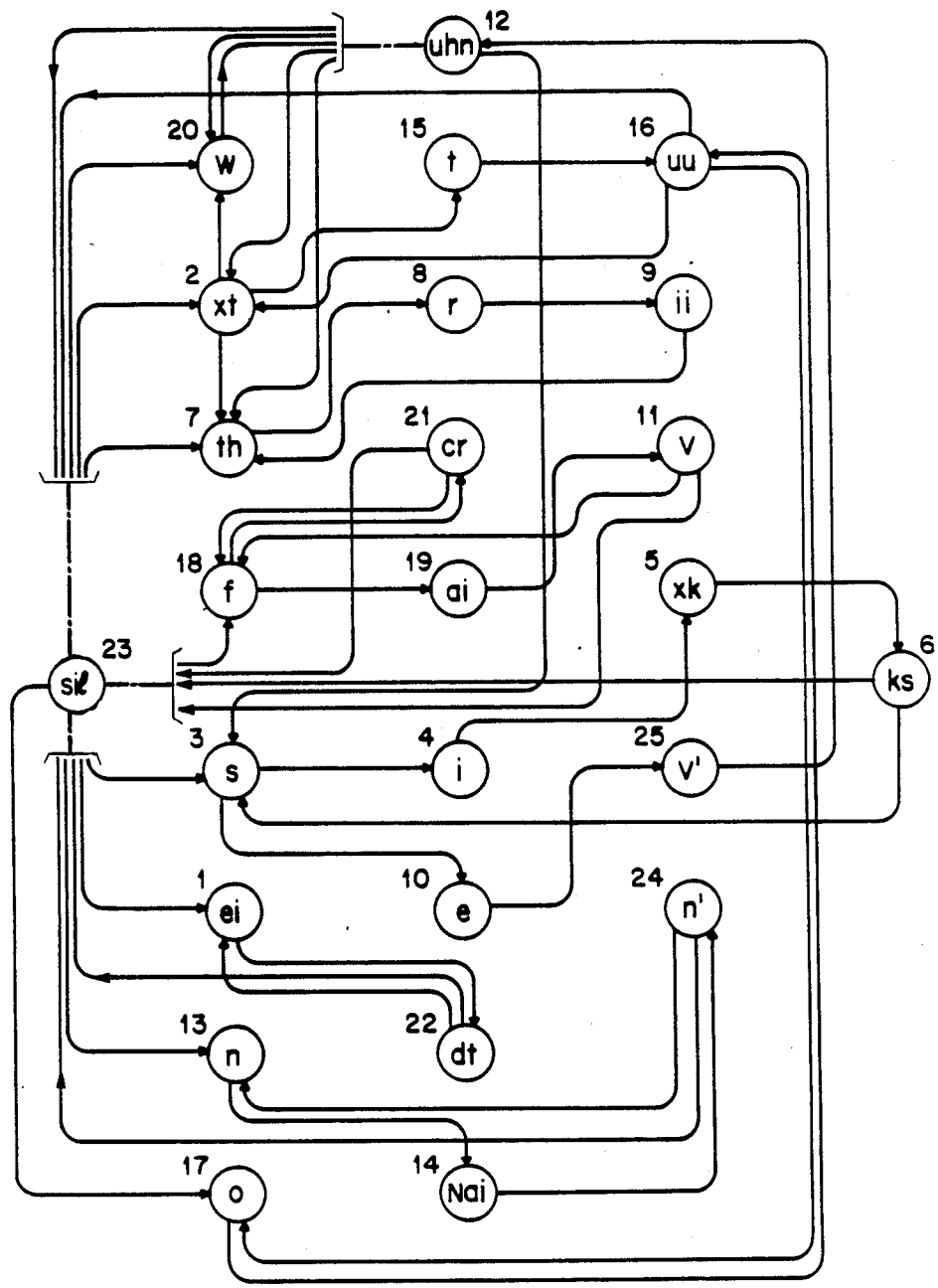
FIG. 9 is a flowchart of the implementation of a simple acoustic/phonetic model for the digits 0-9 as would be employed as a part of the lexical access procedures disclosed herein.

For recognizing the digits, 0-9, a 22 state model can be constructed, as shown in FIG. 9. To simplify the structure of the underlying Markov chain three states are replicated to bring the total to 25. Vectors associated with each segment are collected and maximum likelihood estimators for means, covariances, durations and standard deviations of duration are computed. The values obtained for a segment are then used as the parameter values associated with the corresponding state.

The transition probabilities of the underlying Markov chain are estimated on the assumption that all digits are equally likely. Given that assumption, it is a simple matter to count the number of times each transition will occur from which event counts the transition probabilities are easily obtained.

FIG. 9 shows the kinds of phonetic elements which speech recognition workers have come to accept as being the most likely representation of the irreducible elements of the hidden process occurring in the vocal tract, or, at least, the most convenient representations of those elements.

It will be immediately apparent to many workers in the art of various modifications that can be made upon the above-described techniques depending on the level of generality and capability versus the level of complexity required in a system according to my present invention.

APPENDIX A $q_j$ = state j $O_t$ = feature vector at time t $\alpha_{jt}$ = joint log likelihood of $O_1 O_2 \cdots O_t$ and $\hat{q}_1 \hat{q}_2 \cdots \hat{q}_k$ $\beta_{jt}$ = pair of pointers to previous state and time $S_j \tau = \sum_{\theta}^{\tau} = 1 b_{jt-\tau+\theta}$ $\breve{\alpha}$ = maximum duration of a state $b_{jt}$ = log likelihood of $O_t$ given $q_j$ $d_{jt}$ = log likelihood of duration t given $q_j$ $a_{ij}$ = probability of transition from $q_1$ to $q_j$ $\pi_j$ = probability of $q_j$ at t=0

$p$ = joint log likelihood of $O_1 O_2 \cdots O_t$ and $\hat{q}_1 \hat{q}_2 ... \hat{q}_l$ $\hat{q}_j$ = $j^{\underline{th}}$ state in estimated state sequence $\hat{d}_j$ = duration of $\hat{q}_j$ $v$ = candidate word $W_r$ = $r^{th}$ entry in the lexicon $\hat{W}$ = is the best candidate word $C_n$ = the $n^{th}$ candidate word

APPENDIX B

```
      parameter (maxn=22,maxd=16,maxl=8,maxt=600,litems=10,nlsym=6
 &,maxtau=45,latsiz=30,lenq=60,maxwrds=30,nvn=2,nvt=10,lrhs=2
 &,lstack=50)
      real nu(maxn)
      dimension eta(maxn),u(maxd,maxd,maxn),av(maxd,maxn),pi(maxn)
 &,o(maxd,maxt),lexicon(litems,nlsym),nsym(litems),a(maxn,maxn)
 &,b(maxn,maxt),alpha(maxt,maxn),a1(maxn,maxn),link(litems,nlsym)
 &,d(maxn,maxtau),detu(maxn),pb(maxn,maxtau),wrdlat(latsiz,4)
 &,nodlst(lenq),priq(lenq),u0(maxd,maxd,maxn),pi1(maxn),sum(maxn)
 &,x(maxn,maxtau)
      integer qbar(maxt),digits(maxl),dur(maxt),db,qlen,t
 &,deltat,lpiv(2*maxd,maxn),qhat(maxt),beta(maxt,maxn),dhat(maxt)
 &,head(maxn,maxn),entry,sntnce(lenq,maxwrds),sntlen(lenq)
 &,what(maxwrds),table(nvn,nvt),rhs(lrhs,nvn,nvt),stack(lstack
 &),rulenum(nvn,nvt),deriv(lstack),top,wdcode(lstack)
      character*4 statename(maxn)
      common/vector/r(maxd,maxd)/work/v(maxd,maxd,maxn)
1000  format('DIGIT STRING',1014)
1001  format(/'STATE SEQUENCE'/5(2513/))
1002  format(/'DURATIONS'/5(2513/))
1003  format(/'NUMBER OF OBSERVATIONS = ',16)
1004  format(/'OBSERVATION SEQUENCE',250(/6f10.6))
1005  format('LOG LIKELIHOOD = ',e14.7//'ESTIMATED STATE SEQUENCE'/
 &5(2513/))
1006  format(4(5(e14.7,1x)/))
1007  format(2(1016/))
1008  format('ESTIMATED DURATIONS'/5(2513/))
1009  format('HEADS'/20(2013/))
1010  format('LINKS'/10(613/))
1011  format('WORD LATTICE'/' ENTRY  WORD   TI   TF LOG LIKELIHOOD'/
 &30(416,1x,e14.7/))
1012  format(/'RECOGNIZED STRING = ',2013)
1013  format(/'SEARCH FAILED.  BEST PARTIAL STRING = '1513)
1014  format(/'LOG LIKELIHOOD = ',e14.7//)
1015  format(1x,a,13,a,711)
      data deltat,ndigit,inv,istar/45,7,1,1/
      x=xfld(1)
      entry=0
      open(1,file='BLKDAT')
      read(1,*)db,nstates,pi,nsym,lexicon,table,rhs,rulenum
      close (1)
```

```
      open (3,file='nlist.cntnt')
      call rdparams(db,nstates,a,nu,eta,u,av,statename)
      do 100 k=1,maxn
      do 100 i=1,maxd
      do 100 j=1,maxd
100   u0(i,j,k)=u(i,j,k)
      call setup(lexicon,litems,nsym,nlsym,nstates,head,link)
      open (1,file='lexactst.out')
1     write(6,*)'ENTER FIRST STRING, NUMBER OF STRINGS'
      read(5,*)istr,nstr
      if(nstr .eq. 0) go to 3
      write(6,*)'ENTER NUMBER OF SENTENCE TO BE TRACED, 0 FOR NONE'
      read(5,*)ntrace
      write(6,*)'ENTER 0 FOR SIMULATED DATA, 1 FOR REAL DATA'
      read(5,*)isim
      do 2 n=istr,nstr
      itrace=0
      if(n .eq. ntrace) itrace=1
      if(itrace .eq. 1) write(1,1009)((head(i,j),j=1,nstates),i=1,nst
     &ates)
      if(itrace .eq. 1)write(1,1010)((link(i,j),j=1,nlsym),i=1,litems)
      write(1,*)'STRING ',n
      if(isim .eq.0) call fesim(lexicon,nsym,litems,eta,nu,u0,av,db,ma
     &xd,t,qlen,ndigit,digits,qbar,dur,o)
      if(isim .ne. 0) call rdspch(nstates,db,n,statename,dur,qbar,qlen
     &,o,t,digits,ier)
      if(ier*isim .ne. 0) go to 2
      write(6,1015)'STRING ',n,': ',(digits(i),i=1,ndigit)
      write(1,1000)(digits(i),i=1,ndigit)
      write(1,1001)(qbar(i),i=1,qlen)
      write(1,1002)(dur(i),i=1,qlen)
      write(1,1003)t
      if(itrace .eq. 1) write(1,1004)((o(i,j),i=1,db),j=1,t)
      call stseqcmp(a,b,pi1,pb,av,u,nu,eta,db,nstates,t,o,alpha,beta,p
     &,maxn,maxd,maxt,al,d,deltat,detu,v,lpiv,qhat,dhat,len,inv,x,sum
     &,istar,maxtau)
      if(itrace .eq. 1) write(1,1006)((alpha(i,j),j=1,nstates),i=1,t)
      if(itrace .eq. 1) write(1,1007)((beta(i,j),j=1,nstates),i=1,t)
      write(1,1005)p,(qhat(i),i=1,len)
      write(1,1008)(dhat(i),i=1,len)
      if(ntrace .eq. 0) go to 2
      call lexacc(qhat,dhat,len,lexicon,nsym,litems,nlsym,maxt,pi,al,b
     &,t,maxn,d,maxtau,link,head,wrdlat,latsiz,entry,ier)
      write(1,1011)(i,(ifix(wrdlat(i,j)),j=1,3),wrdlat(i,4),i=1,entry)
      if(ier .ne. 0) write(1,*)'TABLE OVERFLOW'
      call sntcon(wrdlat,latsiz,nodlst,priq,sntnce,sntlen,lenq,
     &score,what,lwhat,maxwrds,t,entry,ier,deriv,table,nvn,nvt,rhs,lrhs,
     &rulenum,stack,lstack,top,wdcode,itrace)
      if(ier .eq. 0) write(1,1012)(what(i),i=1,lwhat)
      if(ier .eq. 1) write(1,1013)(what(i),i=1,lwhat)
      write(1,1014)score
2     continue
      go to 1
3     close (1)
      close (3)
      stop
      end
      subroutine rdparams(ndim,nstates,a,nu,eta,u,av,statename)
      real nu(nstates),eta(nstates),av(ndim,nstates),u(ndim,ndim,nstat
     &es),a(nstates,nstates)
      character title
      character*4 statename(nstates)
1000  format(a)
1001  format(5(1x,e14.7))
1003  format(10x,f10.5,f10.5,7x,a)
      open (1,file='durstats.out')
      read(1,1000)title
      do 3 n=1,nstates
3     read(1,1003)eta(n),nu(n),statename(n)
      close (1)
```

```fortran
      open (2,file='lambda')
      read(2,1001,end=4)a,nu,eta,av,u
4     close (2)
      do 5 n=1,nstates
      eta(n)=nu(n)/eta(n)**2
5     nu(n)=nu(n)*eta(n)
      return
      end subroutine rdspch(nstates,ndim,n,statename,dur,qbar,qlen,o,nfram
     &e,digits,ier)
      integer dur(1),qbar(1),qlen,digits(7)
      dimension ibuf(16),o(ndim,1),w(16),op(16)
      character*4 statename(nstates),filename,title,state
1000  format(a)
1001  format(2I4,I8,16I4)
1002  format(3x,3I1,1x,4I1)
1003  format(3x,f6.4,1x,f6.4,7x,a)
1007  format(4x,3I1,1x,4I1)
1008  format(4x,f6.4,1x,f6.4,7x,a)
      pi=3.1415926553
      do 11 i=1,ndim
11    w(i)=1.0+(float(ndim)/2.0)*sin(pi*float(i)/float(ndim))
      nx=3
      if(n .gt. 9) nx=4
      ier=1
      if(nx .eq. 3) read(3,1002)digits
      if(nx .eq. 4) read(3,1007)digits
      if(n .eq. 2 .or. n .eq. 9 .or. n .eq. 16) go to 10
      filename(1:4)='n   '
      if(n .gt. 9) go to 1
      filename(2:2)=char(48+n)
      filename(3:3)='r'
      go to 2
1     filename(2:2)=char(48+n/10)
      filename(3:3)=char(48+mod(n,10))
      filename(4:4)='r'
2     open (2, file=filename)
      read(2,1000)title
3     read(2,1001,end=9)nframe,nclass,nsamp,(ibuf(i),i=1,ndim)
      do 4 i=1,ndim
      o(i,nframe)=sin(float(ibuf(i)-4096)/2048.0)
4     continue
      go to 3
9     close (2)
      do 91 i=1,nframe
      call ro2op(o(1,i),op,ndim,ndim)
      do 91 j=1,ndim
91    o(j,i)=w(j)*op(j)
      if(n .le. 9) filename(3:3)='l'
      if(n .gt. 9) filename(4:4)='l'
      open(4,file=filename)
      qlen=0
5     if(nx .eq. 3) read(4,1003,end=8)t1,t2,state
      if(nx .eq. 4) read(4,1008,end=8)t1,t2,state
      qlen=qlen+1
      dur(qlen)=ifix((t2-t1)*100.0)
      do 6 i=1,nstates
      if(state .eq. statename(i)) go to 7
6     continue
7     qbar(qlen)=i
      go to 5
8     close (4)
      ier=0
10    return
      end
```

```
c...
c...     subroutine to convert the reflection coefficient to cepstral
c...     coefficient. allows cepstral extension.
c...
         subroutine ro2cp(ro,cp,m,mcp)
c...
c...          ro    - input reflection coefficient array
c...          cp    - output cepstral coefficient array
c...          m     - order of the reflection arrary
c...          mcp   - desired length of the cepstral coeff vector
c...
         dimension ro(1),cp(1),a(50)
c...
         iorder=m
         call ro2a(a,ro,iorder)
         call a2cp(a(2),cp,iorder,mcp)
         return
         end
c...
c...     do conversion from ro to a
c...
         subroutine ro2a(a,ro,m)
         implicit integer (i-n)
         integer m
         dimension a(2),ro(1)
         a(1)=1.
         a(2)=ro(1)
         mm1=m-1
         if(m.le.1) go to 130
         do 120 i=1,mm1
         ip1=i+1
         i2=ip1/2
         roip1=ro(ip1)
         do 110 j=1,i2
         ij=ip1-j
         ta=a(j+1)+roip1*a(ij+1)
         a(ij+1)=a(ij+1)+roip1*a(j+1)
110      a(j+1)=ta
         a(ip1+1)=roip1
120      continue
130      return
         end
c...
c...     convert a parameter to cepstral parameter
c...
         subroutine a2cp(a,cp,m,n)
c...
c...     a      predictor coefficient, without the leading unity term
c...     cp     cepstral coefficient, c(0) is not cp(1)
c...     m      order of a
c...     n      length of cp desired
c...
         dimension a(1),cp(1)
c
         cp(1)=-a(1)
         do 10 l=2,n
         sum=0.
         l1=l-1
         lm=min(m,l1)
         if(l.le.m) sum=l*a(l)
         do 20 j=1,lm
         jb=l-j
20       sum=sum+a(j)*cp(jb)*jb
10       cp(l)=-sum/l
         return
         end
```

```
      SUBROUTINE STSEQCMP(A,B,PI,PB,AV,U,DBAR,SIGMAD,DB,N,NOBS,O,ALPHA
     1,BETA,P,MAXN,MAXD,MAXT,AL,D,DELTAT,DETU,V,LPIV,QHAT,DHAT,LEN,INV
     2,X,SUM,ISTAR,MAXTAU)
      INTEGER DB,T,TAU,THETA,DELTAT,QHAT(MAXT),TAUMAX,BETA(MAXT,MAXN)
     1,DHAT(MAXT)
      DIMENSION A(MAXN,MAXN),B(MAXN,MAXT),DBAR(MAXN),SIGMAD(MAXN),ALPHA
     2(MAXT,MAXN),AL(MAXN,MAXN),D(MAXN,DELTAT),X(MAXN,MAXTAU)
     3,O(MAXD,MAXT),SUM(MAXN)
     4,DETU(MAXN),AV(MAXD,MAXN),U(MAXD,MAXD,MAXN)
     5,V(MAXN),PI(MAXN)
     6,PB(MAXN,DELTAT),LPIV(2*MAXD,MAXN)
CVD$L CNCALL
      IF(INV .EQ. 0) GO TO 41
      INV=0
      DO 102 J=1,N
102   V(J)=GAMMA(DBAR(J))
      DO 3 J=1,N
      DO 3 T=1,DELTAT
3     D(J,T)=DBAR(J)*ALOG(SIGMAD(J))-ALOG(V(J))+(DBAR(J)-1.0)*ALOG
     &(FLOAT(T))-SIGMAD(J)*FLOAT(T)
CVD$L CNCALL
      DO 2 K=1,N
2     CALL MINV(U(1,1,K),MAXD,DETU(K),LPIV(1,K),LPIV(MAXD+1,K))
      DO 4 I=1,N
      PI(I)=-1.0E36
      DO 4 J=1,N
      AL(I,J)=-1.0E36
      IF(A(I,J) .NE. 0.0) AL(I,J)=ALOG(A(I,J))
4     CONTINUE
      PI(ISTAR)=0.0
41    CONST=FLOAT(DB)*1.8378770
      DO 6 J=1,N
      DO 6 T=1,NOBS
      E=0.0
      DO 51 I=1,DB
      SUM(I)=0.0
      DO 5 K=1,DB
5     SUM(I)=SUM(I)+(O(K,T)-AV(K,J))*U(K,I,J)
51    SUM(I)=SUM(I)*(O(I,T)-AV(I,J))
CVD$L NOCONCUR
      DO 52 I=1,DB
52    E=E+SUM(I)
6     B(J,T)=-0.5*(CONST+ALOG(DETU(J))+E)
      DO 65 J=1,N
      DO 65 TAU=1,DELTAT
65    PB(J,TAU)=0.0
      DO 9 T=1,NOBS
      LT=MIN0(T,DELTAT)
      LTM1=MIN0(T-1,DELTAT)
      DO 9 J=1,N
CVD$L NODEPCHK
CVD$L NOCONCUR
      DO 7 TAU=LT,2,-1
7     PB(J,TAU)=PB(J,TAU-1)+B(J,T)
      PB(J,1)=B(J,T)
      ALPHAMAX=-1.0E36
      IF(T .GT. DELTAT) GO TO 71
      ALPHAMAX=PI(J)+D(J,T)+PB(J,T)
      TAUMAX=T
      IMAX=0
71    DO 72 I=1,MAXN
      DO 72 TAU=1,MAXTAU
72    X(I,TAU)=-1.0E36
      DO 8 I=1,N
      DO 8 TAU=1,LTM1
8     X(I,TAU)=ALPHA(T-TAU,I)+AL(I,J)+D(J,TAU)+PB(J,TAU)
      TEST=MAXVAL(X)
      IF(TEST .LE. ALPHAMAX) GO TO 82
      ALPHAMAX=TEST
      DO 81 IMAX=1,N
```

```
        DO 81 TAUMAX=1,LTM1
        IF(X(IMAX,TAUMAX) .EQ. TEST) GO TO 82
81      CONTINUE
82      ALPHA(T,J)=ALPHAMAX
9       BETA(T,J)=TAUMAX*100+IMAX
        P=-1.0E36
        DO 10 I=1,N
        IF(ALPHA(NOBS,I) .LE. P) GO TO 10
        P=ALPHA(NOBS,I)
        IMAX=I
10      CONTINUE
        T=NOBS
        LEN=MAXT
        QHAT(LEN)=IMAX
11      J=QHAT(LEN)
        LEN=LEN-1
        QHAT(LEN)=MOD(BETA(T,J),100)
        DHAT(LEN+1)=BETA(T,J)/100
        T=T-DHAT(LEN+1)
        IF(QHAT(LEN) .NE. 0) GO TO 11
        DHAT(LEN)=BETA(T,QHAT(LEN))/100
CVD$L NOCONCUR
CVD$L NODEPCHK
        DO 12 I=1,MAXT-LEN
        QHAT(I)=QHAT(LEN+I)
12      DHAT(I)=DHAT(LEN+I)
        LEN=MAXT-LEN
        RETURN
        END function gamma(x)
        dimension b(8)
        data b/-0.577191652,0.988205891,-0.897056937,0.918206857
     &,-0.756704078,0.482199394,-0.193527818,0.035868343/
        y=x
        gamma=1.0
4       if(y .le. 1.0) go to 3
        y=y-1.0
        gamma=gamma*y
        go to 4
3       sum=0.0
        do 2 i=8,1,-1
2       sum=y*(b(i)+sum)
        sum=sum+1.0
        gamma=gamma*sum/y
        return
        end
```

```
C     ..................................................................
C
C        SUBROUTINE
C
C        PURPOSE
C           INVERT A MATRIX
C
C        USAGE
C           CALL
C
C        DESCRIPTION OF PARAMETERS
C           A - INPUT MATRIX, DESTROYED IN COMPUTATION AND REPLACED BY
C               RESULTANT INVERSE.
C           N - ORDER OF MATRIX A
C           D - RESULTANT DETERMINANT
C           L - WORK VECTOR OF LENGTH N
C           M - WORK VECTOR OF LENGTH N
C
C        REMARKS
C           MATRIX A MUST BE A GENERAL MATRIX
C
C        SUBROUTINES AND FUNCTION SUBPROGRAMS REQUIRED
C           NONE
C
C        METHOD
C           THE STANDARD GAUSS-JORDAN METHOD IS USED. THE DETERMINANT
C           IS ALSO CALCULATED. A DETERMINANT OF ZERO INDICATES THAT
C           THE MATRIX IS SINGULAR.
C
C     ..................................................................
C
      SUBROUTINE MINV(A,N,D,L,M)
      DIMENSION A(1),L(1),M(1)
C
C     ..................................................................
C
C        IF A DOUBLE PRECISION VERSION OF THIS ROUTINE IS DESIRED, THE
C        C IN COLUMN 1 SHOULD BE REMOVED FROM THE DOUBLE PRECISION
C        STATEMENT WHICH FOLLOWS.
C
      DOUBLE PRECISION A,D,BIGA,HOLD
C
C        THE C MUST ALSO BE REMOVED FROM DOUBLE PRECISION STATEMENTS
C        APPEARING IN OTHER ROUTINES USED IN CONJUNCTION WITH THIS
C        ROUTINE.
C
C        THE DOUBLE PRECISION VERSION OF THIS SUBROUTINE MUST ALSO
C        CONTAIN DOUBLE PRECISION FORTRAN FUNCTIONS.  ABS IN STATEMENT
C        10 MUST BE CHANGED TO DABS.
C
C     ..................................................................
C
C        SEARCH FOR LARGEST ELEMENT
C
      D=1.0
      NK=-N
      DO 80 K=1,N
      NK=NK+N
      L(K)=K
      M(K)=K
      KK=NK+K
      BIGA=A(KK)
      DO 20 J=K,N
      IZ=N*(J-1)
      DO 20 I=K,N
      IJ=IZ+I
   10 IF(ABS(BIGA)-ABS(A(IJ))) 15,20,20
   15 BIGA=A(IJ)
      L(K)=I
      M(K)=J
   20 CONTINUE
```

```
C
C           INTERCHANGE ROWS
C
C
      J=L(K)
      IF(J-K) 35,35,25
   25 KI=K-N
      DO 30 I=1,N
      KI=KI+N
      HOLD=-A(KI)
      JI=KI-K+J
      A(KI)=A(JI)
   30 A(JI) =HOLD
C
C           INTERCHANGE COLUMNS
C
   35 I=M(K)
      IF(I-K) 45,45,38
   38 JP=N*(I-1)
      DO 40 J=1,N
      JK=NK+J
      JI=JP+J
      HOLD=-A(JK)
      A(JK)=A(JI)
   40 A(JI) =HOLD
C
C           DIVIDE COLUMN BY MINUS PIVOT (VALUE OF PIVOT ELEMENT IS
C           CONTAINED IN BIGA)
C
   45 IF(BIGA) 48,46,48
   46 D=0.0
      RETURN
   48 DO 55 I=1,N
      IF(I-K) 50,55,50
   50 IK=NK+I
      A(IK)=A(IK)/(-BIGA)
   55 CONTINUE
C
C           REDUCE MATRIX
C
      DO 65 I=1,N
      IK=NK+I
      HOLD=A(IK)
      IJ=I-N
      DO 65 J=1,N
      IJ=IJ+N
      IF(I-K) 60,65,60
   60 IF(J-K) 62,65,62
   62 KJ=IJ-I+K
      A(IJ)=HOLD*A(KJ)+A(IJ)
   65 CONTINUE
C
C           DIVIDE ROW BY PIVOT
C
      KJ=K-N
      DO 75 J=1,N
      KJ=KJ+N
      IF(J-K) 70,75,70
   70 A(KJ)=A(KJ)/BIGA
   75 CONTINUE
C
C           PRODUCT OF PIVOTS
C
      D=D*BIGA
C
C           REPLACE PIVOT BY RECIPROCAL
C
      A(KK)=1.0/BIGA
   80 CONTINUE
C
```

```
C       FINAL ROW AND COLUMN INTERCHANGE
C
        K=N
100     K=(K-1)
        IF(K) 150,150,105
105     I=L(K)
        IF(I-K) 120,120,108
108     JQ=N*(K-1)
        JR=N*(I-1)
        DO 110 J=1,N
        JK=JQ+J
        HOLD=A(JK)
        JI=JR+J
        A(JK)=-A(JI)
110     A(JI) =HOLD
120     J=M(K)
        IF(J-K) 100,100,125
125     KI=K-N
        DO 130 I=1,N
        KI=KI+N
        HOLD=A(KI)
        JI=KI-K+J
        A(KI)=-A(JI)
130     A(JI) =HOLD
        GO TO 100
150     RETURN
        END subroutine lexaco(qhat,dhat,len,lexicon,nsym,litems,nlsym,maxt
     &,pi,al,b,nobs,maxn,d,maxtau,link,head,wrdlat,latsiz,entry,ier)
        integer qhat(maxt),dhat(maxt),lexicon(litems,nlsym),nsym(nlsym)
     &,link(litems,nlsym),head(maxn,maxn),t,entry
        dimension al(maxn,maxn),b(maxn,maxt),d(maxn,maxtau),wrdlat(
     &latsiz,1),pi(maxn)
        entry=0
        do 2 t=1,len-1
        la0=head(qhat(t),qhat(t+1))
        la=la0
        if(la .eq. 0) go to 2
        do 1 k=1,nsym(la)-1
        if(lexicon(la,k) .ne. qhat(t)) go to 1
        if(lexicon(la,k+1) .ne. qhat(t+1)) go to 1
        call insert(la,t,k,qhat,dhat,len,pi,al,b,d,maxn,maxt,maxtau
     &,nobs,lexicon,litems,nsym(la),wrdlat,latsiz,entry,ier)
        la=link(la,k)
        if(la .eq. 0) la=la0
1       continue
2       continue
        return
        end subroutine insert(la,t,k,qhat,dhat,len,pi,al,b,d,maxn,maxt,maxta
     &u,nobs,lexicon,litems,nsym,wrdlat,latsiz,entry,ier)
        integer qhat(maxt),dhat(maxt),entry,tau0,tau,t
        dimension wrdlat(latsiz,1),al(maxn,maxn),b(maxn,maxt)
     &,d(maxn,maxtau),lexicon(litems,1),pi(maxn)
        data pnlty,durmin/-1.0e37,9.0/
        entry=entry+1
        ier=1
        if(entry .gt. latsiz) go to 5
        wrdlat(entry,1)=float(la-1)
        isum=1
        do 1 i=1,t-k
1       isum=isum+dhat(i)
        wrdlat(entry,2)=float(isum)
        do 2 i=t-k+1,t-k+nsym
2       isum=isum+dhat(i)
        wrdlat(entry,3)=isum-1
```

```
            if(ifix(wrdlat(entry,3)) .gt. nobs) go to 19
            if(wrdlat(entry,3)-wrdlat(entry,2) .gt. durmin) go to 20
19          entry=entry-1
            go to 41
20          do 21 i=1,entry-1
            if(wrdlat(i,1) .ne. wrdlat(entry,1)) go to 21
            if(wrdlat(i,2) .ne. wrdlat(entry,2)) go to 21
            if(wrdlat(i,3) .ne. wrdlat(entry,3)) go to 21
            entry=entry-1
            go to 41
21          continue
            tau0=wrdlat(entry,2)-1
            sum=0.0
c           if(tau0 .eq. 0) sum=alog(pi(lexicon(la,1)))
            do 4 i=1,nsym
            if(i .lt. nsym) sum=sum+al(lexicon(la,i),lexicon(la,i+1))
            if(i .lt. nsym .or. t-k+nsym+1 .gt. len) go to 28
            onotn=al(lexicon(la,i),qhat(t-k+nsym+1))
            if(onotn .lt. pnlty) onotn=pnlty
            sum=sum+onotn
28          sum=sum+d(lexicon(la,i),dhat(t-k+i))
            do 3 tau=1,dhat(t-k+i)
3           sum=sum+b(lexicon(la,i),tau0+tau)
4           tau0=tau0+dhat(t-k+i)
            wrdlat(entry,4)=sum
41          ier=0
5           return
            end subroutine sntcon(wrdlat,latsize,nodlst,priq,sntnoe,sntlen
     &,lenq,score,what,lwhat,maxwrds,nobs,lentry,ier,deriv,table,nvn,nvt
     &,rhs,lrhs,rulenum,stack,lstack,top,wdcode,itrace)
      dimension wrdlat(latsize,1),nodlst(lenq),priq(lenq)
      integer sntnoe(lenq,maxwrds),sntlen(lenq),what(maxwrds),qpnt,qpn
     &tx,enderr,table(nvn,nvt),rhs(lrhs,nvn,nvt),stack(lstack),rule
     &num(nvn,nvt),deriv(lstack),top,wdcode(lstack),begerr
      logical add
      data maxintp/25/,bignum/1.0e36/,idel/1/,enderr/25/,hhat/-7.0/
     &,begerr/15/,maxintm/9/
1000  format(1x,a,i3,1x,e14.7,15i3)
1001  format(1x,a,15i3)
1002  format(1x,a,i3,a,i3)
      lwhat=0
      top=1
      intrvlm=1
      intrvlp=1
      ier=1
      maxpnt=1
      minpnt=2
      do 100 i=1,lenq
100   priq(i)=-bignum
      do 1 i=1,lentry
      if(ifix(wrdlat(i,2)) .gt. begerr) go to 1
      h=wrdlat(i,4)+(float(nobs)-wrdlat(i,3))*hhat
      call push(priq,qpnt,maxpnt,minpnt,h,lenq)
      nodlst(qpnt)=ifix(wrdlat(i,3))
      sntlen(qpnt)=1
      sntnoe(qpnt,1)=ifix(wrdlat(i,1))
      if(itrace .eq. 1)
     & write(1,1000)'INITIAL PUSH',qpnt,h,sntnoe(qpnt,1)
1     continue
2     if(itrace .eq. 1 .and. (intrvlm .gt. maxintm .or. intrvlp .gt.
     &maxintp)) write(1,1002)'RECOVERY FROM DEAD PATH: OVERLAP
     &/GAP = ',intrvlm,'/',intrvlp
      intrvlm=1
      intrvlp=1
3     call pop(priq,qpnt,maxpnt,minpnt,score,lenq)
      if(score .le. -bignum) go to 10
      lwhat=sntlen(qpnt)
      do 31 j=1,lwhat
      what(j)=sntnoe(qpnt,j)
```

```
c  Check for grammatical acceptability of the current best string
c       wdcode(j)=what(j)+1
c       call pda(wdcode,j,deriv,table,nvn,nvt,rhs,lrhs,rulenum,
c      &stack,istack,top,iparse)
31      continue
c       if(itrace .eq. 1)
c      & write(1,1001)'DERIVATION ',(deriv(j),j=1,lwhat)
c       if(iparse .ne. 0) go to 2
c End of syntax checking
        if(itrace .eq. 1)
       & write(1,1000)'POP  ',qpnt,score,(what(j),j=1,lwhat)
4       last=nodlst(qpnt)
        if(last .gt. nobs-enderr .and. top .eq. 1) go to 8
        if(last .gt. nobs-enderr .and. top .gt. 1) go to 2
        add=.false.
        do 6 i=1,lentry
        if(ifix(wrdlat(i,2)) .lt. last-intrvlm) go to 6
        if(ifix(wrdlat(i,2)) .gt. last+intrvlp) go to 6
        if(itrace .eq. 1)
       & write(1,1000)'NEXT FRAME = ',ifix(wrdlat(i,2))
        h=wrdlat(i,4)-(wrdlat(i,3)-wrdlat(i,2)+1.0)*hhat
        scorex=score+h
        call push(priq,qpntx,maxpnt,minpnt,scorex,lenq)
        if(qpntx .eq. 0) go to 6
        nodlst(qpntx)=ifix(wrdlat(i,3))
        do 5 j=1,lwhat
5       sntnce(qpntx,j)=what(j)
        sntlen(qpntx)=lwhat+1
        sntnce(qpntx,sntlen(qpntx))=ifix(wrdlat(i,1))
        if(itrace .eq. 1)
       & write(1,1000)'PUSH ',qpntx,scorex,(sntnce(qpntx,j),j=1,sntlen(qp
       &ntx))
        add=.true.
6       continue
        if(add) go to 2
        if(intrvlp .lt. maxintp) intrvlp=intrvlp+idel
        if(intrvlm .lt. maxintm) intrvlm=intrvlm+idel
        if(intrvlp .eq. maxintp .and. intrvlm .eq. maxintm) go to 2
        go to 4
8       lwhat=sntlen(qpnt)
        do 9 i=1,lwhat
9       what(i)=sntnce(qpnt,i)
        ier=0
10      return
        end SUBROUTINE PUSH(VALUE,NODE,MAXNOD,MINNOD,VALNOD,LENQ)
        DIMENSION VALUE(LENQ)
        NODE=0
        IF(VALNOD .LE. VALUE(MINNOD)) GO TO 2
        VALUE(MINNOD)=VALNOD
        NODE=MINNOD
        IF(VALNOD .GT. VALUE(MAXNOD)) MAXNOD=MINNOD
        SMALL=1.0E36
        DO 1 N=1,LENQ
        IF(VALUE(N) .GE. SMALL) GO TO 1
        SMALL=VALUE(N)
        MINNOD=N
1       CONTINUE
2       RETURN
        END
```

```
      SUBROUTINE POP(VALUE,NODE,MAXNOD,MINNOD,VALNOD,LENQ)
      DIMENSION VALUE(LENQ)
      SMALL=-1.0E36
      NODE=MAXNOD
      VALNOD=VALUE(MAXNOD)
      VALUE(MAXNOD)=SMALL
      MINNOD=MAXNOD
      DO 1 N=1,LENQ
      IF(VALUE(N) .LE. SMALL) GO TO 1
      SMALL=VALUE(N)
      MAXNOD=N
1     CONTINUE
      RETURN
      END subroutine pda(w,wi,deriv,table,nvn,nvt,rhs,lrhs,rulenum,stack
     &,stksiz,top,ier)
      integer w(1),wi,table(nvn,nvt),rhs(lrhs,nvn,nvt),stack(1)
     &,ier,stksv,stksiz,top,rulenum(nvn,nvt),deriv(1)
      ier=1
      if(wi .gt. 1) go to 1
      top=1
      stack(top)=1
1     stksv=stack(top)
      top=top-1
      if(top .lt. 0) go to 3
      npush=table(stksv,w(wi))
      if(npush .lt. 0) go to 3
      deriv(wi)=rulenum(stksv,w(wi))
      do 2 n=1,npush
      top=top+1
      if(top .gt. stksiz) go to 3
2     stack(top)=rhs(n,stksv,w(wi))
      if(top .eq. 0) go to 3
      ier=0
3     return
      end
```

What is claimed is:

1. A method for the recognition of speech, of the type including the steps of storing signals representing a model of the language to be recognized, said model being of the state-transitional type, each state being uniquely identified with a phonetic unit, each state having associated with it a portion of a transition matrix which describes which states can follow it and with what probability, each state having associated with it an observational density function assigning to each set of speech feature signals that may be observed in fluent speech a likelihood of being observed in association with that state, each state having associated with it a durational density function assigning to each duration it may have a likelihood of occurrence in fluent speech;

storing signals representing lexical candidates, said lexical candidates being assemblages of phonetic units of the language in association with partial phonetic information of the type found in dictionaries;

sequentially converting successive time frame portions of an utterance into signals representing respective sets of acoustic feature signals representative of the portions; and accessing the stored model and stored lexical candidates to obtain signals which represent sequences of the phonetic units, including selecting the optimum ones of such sequences to produce a selection signal representing recognition of the utterance, said method being particularly characterized in that the accessing step includes assigning a phonetic unit signal and a phonetic duration signal from the stored model to one or more of said time frame portions of speech in response to one or more of said respective sets of acoustic feature signals, and maximizing independently of the stored lexical candidates the likelihoods of each phonetic unit and each phonetic duration jointly with the likelihood of observing said one or more of said respective sets of acoustic feature signals, said assigning and maximizing being performed recursively for all assignments and transitions over all time frames up to and including the present time frame; and then retracing the actual maximization results by stepping through the phonetic determinations in a strict order to produce a proposed phonetic sequence for accessing the lexical candidates, and subsequently accessing the stored lexical candidates with the proposed phonetic sequence to obtain signals representing a set of proposed lexical candidates, from which signals a final selection signal can be obtained.

2. A method for the recognition of speech, of the type claimed in claim 1, said method being further characterized in that the model storing step includes storing an ergodic model in which any state can occur after any other state, the model including examples of all such sequences and the corresponding transition probability signals.

3. A method for the recognition of speech, of the type claimed in claim 2;
said method being further characterized in that
the lexical candidate storing step comprises
storing words represented by a phonetic orthography which is characterized by partial phonetic information, such that words may be retrieved on the basis of the phonetic units which they contain, and
storing information linking a plurality of words containing like sequences of phonetic units, whereby for each sequence of phonetic units as many words as contain them are directly accessible.

4. A method for the recognition of speech, of the type including the steps of
storing signals representing a model of the language to be recognized, said model being of the state-transitional type, each state being uniquely identified with a phonetic unit,
each state having associated with it a portion of a transition matrix which describes which states can follow it and with what probability,
each state having associated with it an observational density function assigning to each set of speech feature signals that my be observed in fluent speech a likelihood of being observed in association with that state,
each state having associated with it a durational density function assigning to each duration it may have a likelihood of occurrence in fluent speech;
storing signals representing lexical candidates, said lexical candidates being assemblages of phonetic units of the language in association with partial phonetic information of the type found in dictionaries;
sequentially converting successive time frame portions of an utterance into signals representing respective sets of acoustic feature signals representative of the portions; and
accessing the stored model and stored lexical candidates to obtain signals which represent sequences of the phonetic units, including selecting the optimum ones of such sequences to produce a selection signal representing recognition of the utterance,
said method being particularly characterized in that the accessing step includes
first accessing the stored model to obtain signals which represent proposed sequences of phonetic units independently of the stored lexical candidates, and
second accessing the stored lexical candidates in response to portions of the proposed sequences of phonetic units to obtain proposed lexical candidates each containing each said portion, including
whenever multiple proposed lexical candidates contain the same one said portion, aligning said multiple proposed lexical candidates with the one or more respective sets of acoustic feature signals from which said proposed sequences of phonetic units were obtained to evaluate said multiple proposed lexical candidates.

5. A method for the recognition of speech, of the type claimed in claim 4,
said method being further characterized in that
the model storing step includes storing an ergodic model in which any state can occur after any other state.

6. A method for the recognition of speech, of the type claimed in claim 5,
said method being further characterized in that
the aligning step evaluates said multiple proposed lexical candidates to include only those suitable for subsequent unambiguous ranking by processing by techniques that relate to sentence structure and meaning.

7. A method for the recognition of speech, of the type claimed in claim 5,
said method being further characterized in that
the aligning step evaluates said multiple proposed lexical candidates to select only the best one, whereby a selection signal representing the utterance as a word is produced.

8. Apparatus for the recognition of speech, of the type comprising
means for storing signals representing a model of the language to be recognized, said model being of the state-transitional type, each state being uniquely identified with a phonetic unit,
each state having associated with it a portion of a transition matrix which describes which states can follow it and with what probability,
each state having associated with it an observational density function assigning to each set of speech feature signals that my be observed in fluent speech a likelihood of being observed in association with that state,
each state having associated with it a durational density function assigning to each duration it may have a likelihood of occurrence in fluent speech;
means for storing signals representing lexical candidates, said lexical candidates being assemblages of phonetic units of the language in association with partial phonetic information of the type found in dictionaries;
means for sequentially converting successive time frame portions of an utterance into signals representing respective sets of acoustic feature signals representative of the portions; and
means for accessing the stored model and stored lexical candidates to obtain signals which represent sequences of the phonetic units, including means for selecting the optimum ones of such sequences to produce a selection signal representing recognition of the utterance,
said apparatus being particularly characterized in that the accessing means includes
means for assigning a phonetic unit signal and a phonetic duration signal from the stored model to one or more of said time frame portions of speech in response to one or more of said respective sets of acoustic feature signals, and
means for maximizing independently of the stored lexical candidates the likelihoods of each phonetic unit and each phonetic duration jointly with the likelihood of observing said one or more of said respective sets of acoustic feature signals, said assigning means and maximizing means being adapted to operate recursively for all assignments and transitions over all time frames up to and including the present time frame; and said accessing means further includes means for retracing the actual maximization results by stepping through the phonetic determinations in a strict order to produce a proposed phonetic sequence for accessing the lexical candidates, and means for subsequently accessing the stored lexical candidates with the proposed phonetic sequence to obtain signals representing a set of proposed lexical candidates, from which signals a final selection signal can be obtained.

9. Apparatus for the recognition of speech, of the type claimed in claim 8, said apparatus being further characterized in that the means for storing a model includes means for storing an ergodic model in which any state can occur after any other state, the model including examples of all such sequences and the corresponding transition probability signals.

10. Apparatus for the recognition of speech, of the type claimed in claim 9;

said apparatus being further characterized in that the lexical candidate storing means comprises means for storing words represented by a phonetic orthography which is characterized by partial phonetic information, such that words may be retrieved on the basis of the phonetic units which they contain, and means for storing information linking a plurality of words containing like sequences of phonetic units, whereby for each sequence of phonetic units as many words as contain them are directly accessible.

11. Apparatus for the recognition of speech, of the type comprising means for storing signals representing a model of the language to be recognized, said model being of the state-transitional type, each state being uniquely identified with a phonetic unit, each state having associated with it a portion of a transition matrix which describes which states can follow it and with what probability, each state having associated with it an observational density function assigning to each set of speech feature signals that may be observed in fluent speech a likelihood of being observed in association with that state, each state having associated with it a durational density function assigning to each duration it may have a likelihood of occurrence in fluent speech;

means for storing signals representing lexical candidates, said lexical candidates being assemblages of phonetic units of the language in association with partial phonetic information of the type found in dictionaries;

means for sequentially converting successive time frame portions of an utterance into signals representing respective sets of acoustic feature signals representative of the portions; and means for accessing the stored model and stored lexical candidates to obtain signals which represent sequences of the phonetic units, including means for selecting the optimum ones of such sequences to produce a selection signal representing recognition of the utterance, said apparatus being particularly characterized in that the accessing means includes means for first accessing the stored model to obtain signals which represent proposed sequences of phonetic units independently of the stored lexical candidates, and means for next accessing the stored lexical candidates in response to portions of the proposed sequences of phonetic units to obtain proposed lexical candidates each containing each said portion, and the accessing means further includes means for aligning said proposed lexical candidates, whenever more than one exists, with the one or more respective sets of acoustic feature signals from which said proposed sequences of phonetic units were obtained to reduce the number of said proposed lexical candidates.

12. Apparatus for the recognition of speech, of the type claimed in claim 11, said apparatus being further characterized in that the model storing means includes means for storing an ergodic model in which any state can occur after any other state.

13. Apparatus for the recognition of speech, of the type claimed in claim 12, said apparatus being further characterized in that the aligning means evaluates said multiple proposed lexical candidates to include only those suitable for subsequent unambiguous ranking by techniques that relate to sentence structure and meaning.

14. Apparatus for the recognition of speech, of the type claimed in claim 12, said apparatus being further characterized in that the aligning means evaluates said multiple proposed lexical candidates to select only the best one, whereby the aligning means is capable of producing a selection signal representing the utterance as a word.

* * * * *